Sept. 30, 1924.                                             1,510,021
                      J. STURROCK
          FEEDING MECHANISM FOR POTATO PLANTERS
              Filed Sept. 3, 1920        5 Sheets-Sheet 1

Inventor:-
John Sturrock,
By H.P. Doolittle
          Atty.

Sept. 30, 1924.

J. STURROCK 1,510,021

FEEDING MECHANISM FOR POTATO PLANTERS

Filed Sept. 3, 1920  5 Sheets-Sheet 3

Inventor:-
John Sturrock,
By N.P. Dorial
Atty.

Sept. 30, 1924.
J. STURROCK
1,510,021
FEEDING MECHANISM FOR POTATO PLANTERS
Filed Sept. 3, 1920    5 Sheets-Sheet 4
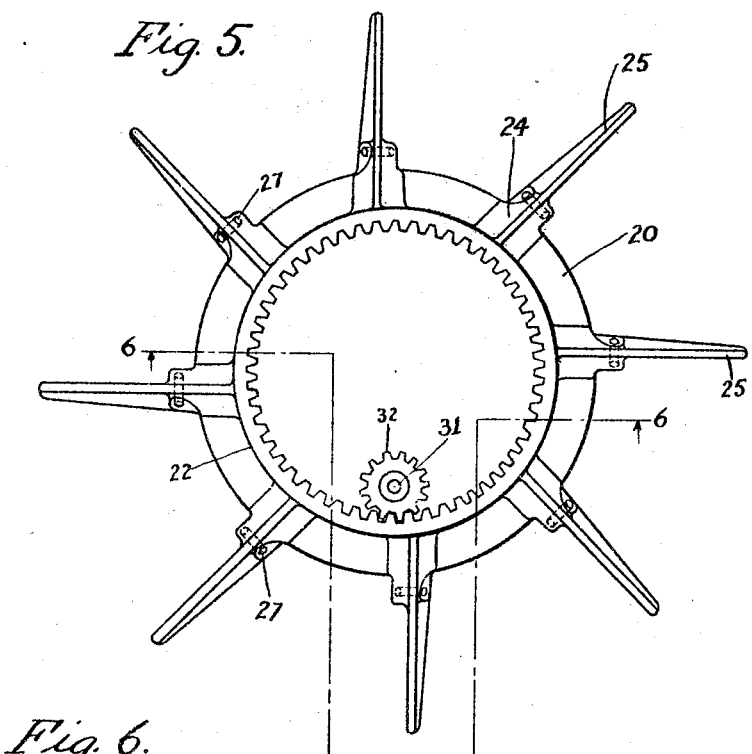
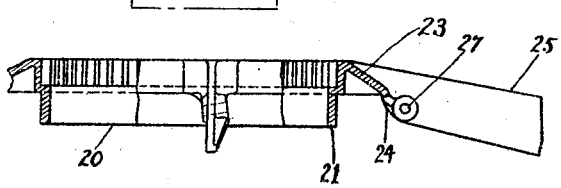
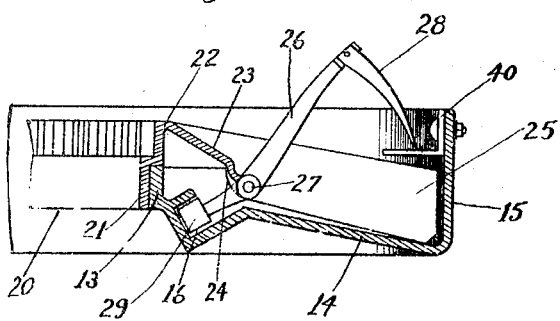
Inventor:-
John Sturrock, Sept. 30, 1924.  1,510,021
J. STURROCK
FEEDING MECHANISM FOR POTATO PLANTERS
Filed Sept. 3, 1920   5 Sheets—Sheet 5

Inventor:-
John Sturrock,
By W. P. Doolittle
Atty.

Patented Sept. 30, 1924.

1,510,021

UNITED STATES PATENT OFFICE.

JOHN STURROCK, OF CHICAGO, ILLINOIS, ASSIGNOR TO INTERNATIONAL HARVESTER COMPANY, A CORPORATION OF NEW JERSEY.

FEEDING MECHANISM FOR POTATO PLANTERS.

Application filed September 3, 1920. Serial No. 407,865.

*To all whom it may concern:*

Be it known that I, JOHN STURROCK, a subject of the King of Great Britain, residing at Chicago, in the county of Cook and State of Illinois, have invented certain new and useful Improvements in Feeding Mechanism for Potato Planters, of which the following is a full, clear, and exact specification.

My invention relates to automatic seed dropping mechanism for potato planters.

The objects of my invention are to provide a feed mechanism for potato planters which will operate without attention from the driver of the planter and which will dispense successive seed potatoes or pieces of potato at regular intervals to the planter mechanism, and to simplify the construction of such mechanism while increasing the degree of accuracy and reliability heretofore attained in devices of this class.

I accomplish these objects by providing a novel form of dispensing mechanism including a horizontally disposed annular or ring-shaped pan in which a carrier is centrally journaled which has mounted on it radially extending seed pickers actuated by a cam track on the pan. The carrier is formed with branches or vanes adjacent each picker which co-operate with them in distribution of the seed potatoes, the seed being brought to the pan by an endless elevator of the chain and cup type operated through the central opening of the pan, the novel construction of these and other parts which will be more specifically described resulting in a marked gain in the efficiency of this class of machines.

With the above and other incidental objects in view, my invention consists of the organization, details of construction, parts or their equivalents hereinafter described and more particularly defined in the claims.

Referring to the drawings:

Fig. 5 is a detail view of the picker carrier;

Fig. 6 is a detail sectional view taken on the lines 6—6, Fig. 5;

Fig. 7 is a detail sectional view on an enlarged scale taken through a lateral half of the picker pan and carrier taken on line 7—7, Fig. 1;

Figure 1:
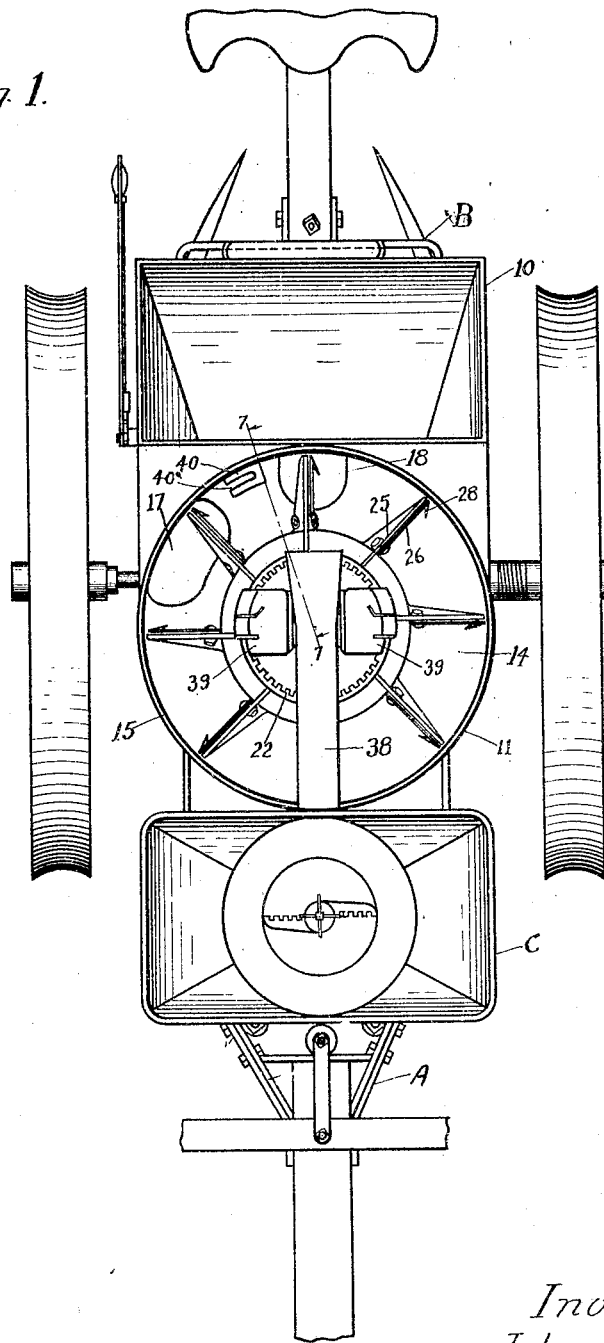
Figure 1 is a plan view of a potato planter embodying my invention.
Figure 2:
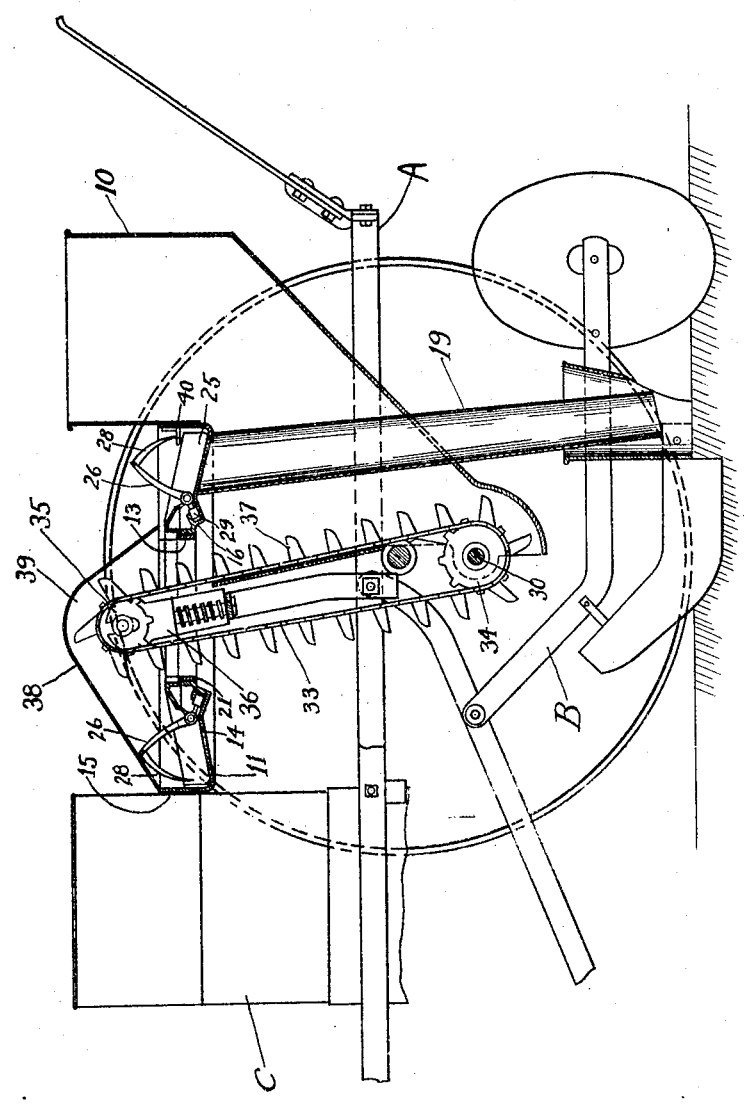
Fig. 2 is a side elevation with the distributing and planting mechanism in section.
Figure 3:
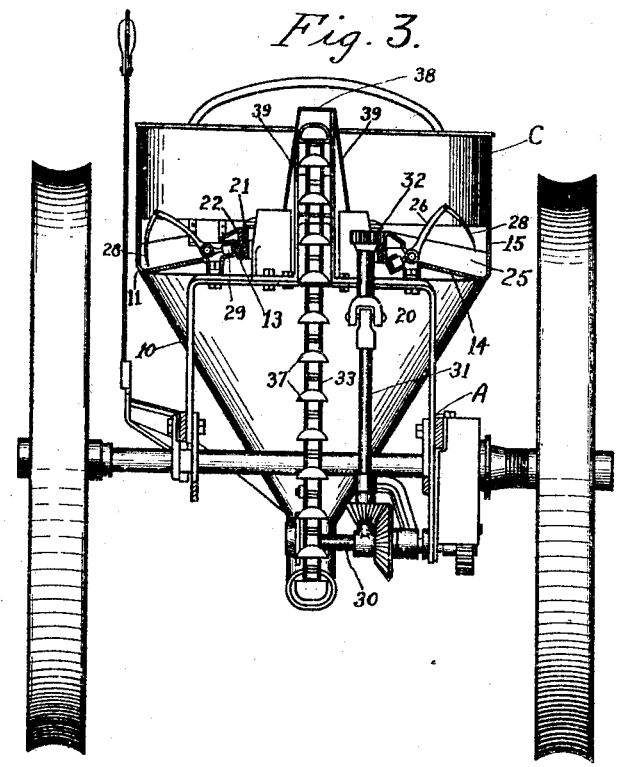
Fig. 3 is a transverse sectional view through the distributing mechanism looking toward the rear of the planter.
Figure 4:
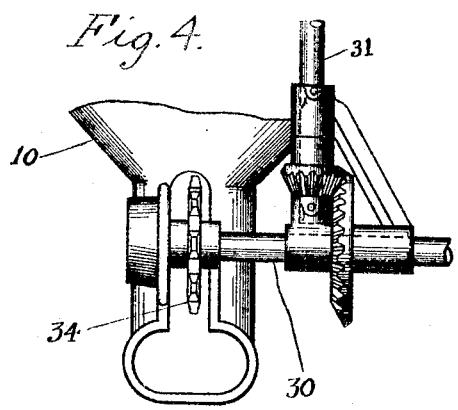
Fig. 4 is a detail view of the driving shaft and related parts.

The invention is illustrated in the drawings in connection with a planter comprising a frame A and planting unit B. The front of the frame may carry a fertilizer hopper C, which would be provided with spreading mechanism, not shown. At the rear of the frame there is mounted a seed hopper 10, which is formed with a funnel-shaped bottom extending to a point below the axle of the planter. At the center of the planter and partly above the lower portion of the hopper, there is fixed an annular pan 11 which is hereafter referred to as the picker pan. This pan is secured to the frame of the planter by counter-sunk bolts 12, and is formed with a low central rim 13 from which the bottom 14 slopes downwardly to a relatively high outer rim 15. On the inner side of the central rim, there is formed a cam track 16 which surrounds the central rim 13. The bottom of the pan is provided with an opening 17 leading to the hopper, and a second opening 18 for the dropping chute 19 which extends downwardly through the hopper 10.

On the central rim of the pan there is journaled a picker carrier 20 formed with a bearing flange 21 (Figs. 6 and 7) adapted to seat on the central rim 13 of the pan, and an outwardly offset upper portion or flange 22 formed with internal gear teeth and an outwardly and downwardly inclined ledge 23, from which extends at regular spaced intervals the picker brackets 24, which are continued as vanes 25 which are shaped to conform to the sloping bottom 14 of the pan and extend approximately to the outer rim 15 thereof.

On each picker bracket 24 a seed picker 26 is pivoted at 27, each picker comprising a relatively long outer arm at the end of which there is fixed a downwardly directed impaling member 28, and a short inner arm terminating in a cam engaging portion such as a roller 29 which engages in the cam track 16.

The carrier 20 is driven from the axle of the planter through a counter-shaft 30 journaled on the frame of the planter, and connected by bevel gears to an upwardly extending flexible shaft 31 carrying drive pinion 32 at its upper end in mesh with the gear teeth on portion 22 of the carrier.

The counter-shaft 30 also serves to drive an endless elevator 33 which engages sprocket 34 on the counter-shaft and a sprocket 35 carried on a spring-pressed bearing frame 36, which is mounted on the planter frame in the center of the middle opening of the picker pan in position to bring the cups 37 on the conveyor a sufficient distance above the pan to assure proper delivery of the seed thereto. The rising run of conveyor 33 enters the lower end of the hopper just below the counter-shaft 30, and travels within the hopper until it reaches the pan 11. A cover 38 resting on the pan is preferably provided for the upper end of the conveyor, and shields 39 on each side of the conveyor to prevent dropping of the seed potatoes through the central opening of the pan.

Figure 8:
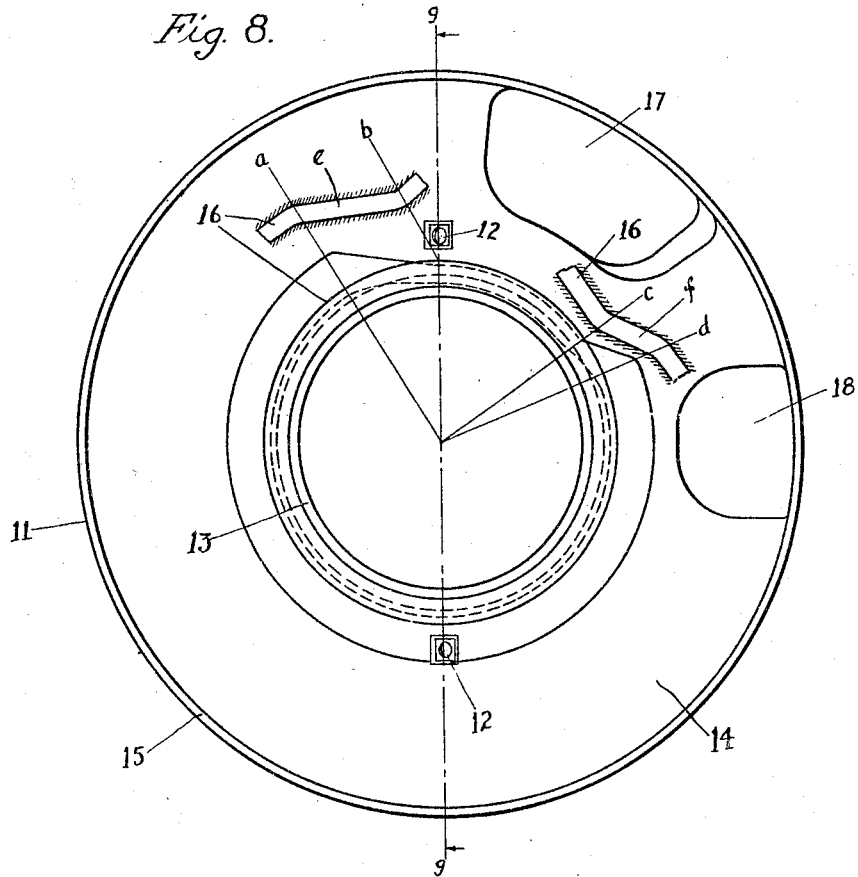
Fig. 8 is an enlarged plan view of the picker pan.
Figure 9:
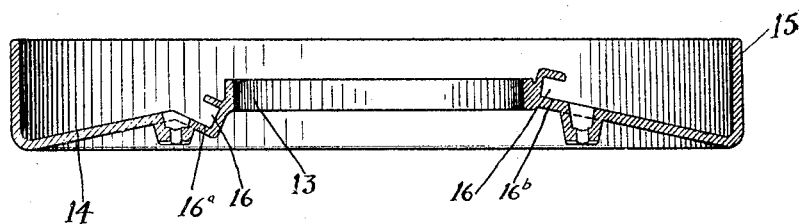
Fig. 9 is a vertical section on the line 9—9, Fig. 8.

The cam track 16 on pan 11 has the greater part of its length depressed as at 16$^a$, Fig. 9, while a comparatively short portion of its length is elevated, as at 16$^b$, Fig. 9. The elevated portion of the track including approaches thereto constitutes only approximately one-fourth of its circumference, while the depressed portion constitutes the remaining three-fourths. Referring to Fig. 8, the radial lines $a$—$d$ indicate the elevated segment of the track, while the lines $a$—$b$ and $c$—$d$ respectively enclose the approaches to the elevated and depressed portions of the cam track diagrammatically represented at $e$ and $f$. Between the openings 17 and 18 in the bottom of the pan and at the upper edge of rim 15, there is secured a stripper plate 40 positioned to co-operate with the impaling members 28 in the manner to be described.

With the carrier in position on the pan the relation of the pickers to the pan will be as shown in Fig. 7, and it is evident that rotation of the carrier will cause the rollers 29 on the picker to follow the course of the cam track 16 with the result that the picker 26 will be held with the impaling member 28 in elevated position from the point marked by line $d$, Fig. 8, around to the point marked by line $a$. At this point the cam track rises, and the impaling members are depressed to the pan bottom, and remain so depressed until the point marked by line $c$ is reached, at which time the impaling members enter the slot 40$^a$ in the stripper plate 40 and simultaneously begin to rise as the approach to the depressed portion of the cam track (beginning at $d$) is reached. The mechanism above described operates as follows:

As the planter travels the counter-shaft 30 drives shaft 31, and through it the picker carrier 20, at the same time driving the elevator 33. As the cups 37 pass into the hopper, they gather one or more pieces of seed, which are carried upwardly and delivered to the picker box 11; these drop between the vanes 25 and are carried around against them in a clock-wise direction. When each vane and its adjacent seed picker reaches the position of line $a$, Fig. 8, the impaling member 28 descends and impales a piece of seed potato. Immediately thereafter the opening 17 is reached and surplus pieces are returned to the hopper 10. The impaled piece remains on the member 28 until opening 17 is passed, and the stripper plate 40 reached when upward movement of the impaled member strips the seed therefrom, permitting the adjacent vane to sweep it into the opening 18 over chute 19. This operation is repeated by each seed picker and vane with the result that successive pieces of seed are dropped at regularly timed intervals to the planting mechanism.

The construction above described exemplifies one form of my invention, and variations from that construction are contemplated within the scope of the appended claims.

What I claim is:

1. In seed feeding mechanism for potato planters, the combination of a cylindrical pan, a carrier mounted in the pan for movement in a horizontal plane, vertically movable impalers on the carrier, stripping means on the pan cooperating with the impalers during movement thereof, and means for actuating the impalers as the carrier moves.

2. In seed feeding mechanism for potato planters, a horizontally positioned picker pan formed with its bottom sloping downwardly from the center of the pan, a carrier mounted to revolve on the pan, vertically movable seed pickers on the carrier extending adjacent the rim of the pan, and means on the pan for causing actuation of the pickers when the carrier is revolved.

3. In seed feeding mechanism for potato planters, a horizontally positioned picker pan formed with its bottom sloping downwardly from the center of the pan, a revolvable carrier centrally jornaled on the pan and provided with radial vanes conforming to the slope of the pan and extending to its rim, vertically movable seed pickers mounted on the carrier adjacent each vane, and means on the pan for causing actuation of the pickers when the carrier is revolved.

4. In seed feeding mechanism for potato planters, the combination of a horizontally positioned annular picker pan, a cam track formed on the inner side of the inner rim of the pan, an annular carrier journaled upon the inner rim and provided with radial vanes extending to its outer rim, and seed pickers pivoted on the carrier adjacent each vane and formed with an outwardly extending impaling portion and an inwardly extending cam engaging portion.

5. In seed feeding mechanism for potato planters, the combination of a horizontally positioned annular picker pan, an annular carrier journaled upon the inner rim of the pan and provided with radial vanes extending to its outer rim, seed pickers pivoted on the carrier adjacent each vane, and means on the pan for causing actuation of the pickers when the carrier is revolved.

6. The combination in a potato planter of an annular picker pan, a revolvable carrier mounted on the pan, radially extending movable seed pickers mounted on the carrier, means on the pan for actuating the pickers when the carrier revolves, and means for supplying seed to the pan through its central opening.

7. The combination in a potato planter of an annular picker pan, a revolvable carrier journaled on the inner rim of the pan and provided with internal gear teeth, a drive shaft with a pinion in mesh with said gear, radially extending movable seed pickers mounted on the carrier, means on the pan for actuating the pickers when the carrier revolves, and means extending upwardly through the central opening of the pan for constantly supplying seed to the pan during operation of the planter.

8. The combination in a potato planter of a horizontally positioned picker pan, means for constantly supplying seed to the pan during operation of the planter, a revolvable carrier within the pan, means for driving the carrier, radially extending movable seed pickers mounted on the carrier, a dropping chute in the bottom of the pan, and means on the pan operatively connected to the seed pickers for causing them to pick up seed in the pan and deliver it to the dropping chute.

9. The combination in a potato planter of a horizontally positioned picker pan, means for constantly supplying seed to the pan during operation of the planter, a revolvable carrier within the pan provided with radial vanes extending to the rim of the pan, seed pickers pivoted on the carrier adjacent each vane, a surplus chute and a dropping chute with openings in the bottom of the pan, a cam on the pan with which the pickers are connected, and a stripper on the pan between the chute openings for releasing the seed from the pickers, said cam being shaped to depress the pickers when remote from the chute opening and to elevate them when engaged with the stripper, the vanes being adapted to deliver surplus seed to the surplus chute.

10. The combination in a potato planter of an annular picker pan, a seed hopper beneath the pan, an endless elevator positioned in the central opening of the pan and communicating with the hopper and adapted to deliver seed from the hopper to the pan, a surplus chute and a dropping chute having openings in the bottom of the pan, the surplus chute leading to the hopper, and means mounted on the pan for delivering single seeds successively to the dropping chute and for delivering surplus seed to the surplus chute.

11. In seed feeding mechanism for potato planters, the combination of a horizontally positioned circular seed pan with its bottom shaped to cause seed potatoes to collect near the wall of the pan, a reciprocable picker mounted to travel in a horizontal path around the inside of the pan in proximity to its wall, and means for causing reciprocation of said picker during travel..

In testimony whereof I affix my signature.

JOHN STURROCK.